United States Patent [19]

Schmölzer et al.

[11] Patent Number: 5,059,652
[45] Date of Patent: Oct. 22, 1991

[54] CROSSLINKING COMPONENTS FOR PAINT BINDERS AND PROCESS FOR THEIR PREPARATION

[75] Inventors: Gerhard Schmölzer; Rudolf Schipfer, both of Graz, Austria

[73] Assignee: Vianova Kunstharz, A.G., Werndorf, Austria

[21] Appl. No.: 375,470

[22] Filed: Jul. 5, 1989

[30] Foreign Application Priority Data

Jul. 4, 1988 [AT] Austria ................. 1721/88

[51] Int. Cl.$^5$ ................. C08G 18/28; C08G 18/80; C09D 167/00; C09D 175/00
[52] U.S. Cl. ................. 524/591; 528/45
[58] Field of Search ................. 528/45; 524/591

[56] References Cited

U.S. PATENT DOCUMENTS

| | | | |
|---|---|---|---|
| 4,373,081 | 2/1983 | Nachtkamp et al. | 528/45 |
| 4,554,188 | 11/1985 | Holubka et al. | 528/45 |
| 4,559,383 | 12/1985 | Holubka et al. | 528/45 |
| 4,789,696 | 12/1988 | Paar et al. | 528/45 |
| 4,857,581 | 8/1989 | Paar et al. | 524/5912 |
| 4,906,692 | 3/1990 | Plum et al. | 524/591 |

*Primary Examiner*—John Kight, III
*Assistant Examiner*—Rabon Sergent
*Attorney, Agent, or Firm*—Breiner & Breiner

[57] ABSTRACT

Crosslinking components for paint binders containing hydroxyl groups, tertiary and/or secondary and/or primary amino groups, particularly for cathodically depositable paints, which can be crosslinked by transesterification and/or transamidation and/or transurethanization, containing for each molecule at least 0.5 transesterifiable groups obtained from CH-activated esters and at least 0.5 blocked isocyanate groups. The crosslinking components are produced by partial transesterification of a polyol, preferably a triol, with a CH-activated ester, preferably a malonic acid diester, and subsequent reaction with a partially blocked polyisocyanate. Paint binders containing the crosslinking components cure at low-bake temperatures to provide films with good surface characteristics.

10 Claims, No Drawings

CROSSLINKING COMPONENTS FOR PAINT BINDERS AND PROCESS FOR THEIR PREPARATION

FIELD OF INVENTION

The present invention relates to crosslinking components for water-dilutable paint binders, particularly for cathodically depositable paints, and to a process for preparing these crosslinking components. More particularly, this invention is directed to the formulation of cathodically depositable paints which can be crosslinked at stoving temperatures of below 140° C. under industrial conditions, to provide paint films which satisfy the stringent requirements of the consumers, particularly in the automobile industry, both in terms of their protective qualities against chemical or mechanical influences and in terms of their surface structure.

BACKGROUND OF INVENTION

A number of patent specifications, such as European Patent Nos. 00 00 086; 00 40 867, and 00 79 629; or Austrian Patent Nos. 372,099, 379,602, and 385,039 describe binder systems which are crosslinked by transesterification with active ester groups. The systems of the above-noted Austrian patents exhibit a high stoving reactivity when thus formulated and, on being stoved at 130° C. to 140° C., yield paint films of a high crosslinking density with a smooth surface and excellent corrosion resistance on zinc phosphatized sheet steel. The crosslinking density necessary to achieve this corrosion preventive effect, however, is recognized to have a negative influence on the mechanical properties and the adhesion to the substrate, particularly if there is no pre-treatment or only an inadequate pre-treatment of the substrate.

Numerous publications describe the crosslinking of cathodically depositable paint films by transurethanization via blocked isocyanate groups. By a suitable choice of blocking agent, the desired temperature range for crosslinking can also be achieved. Representative teachings are found in EP 02 06 071 and in Ep 01 18 743. With these systems, the deblocking of the isocyanate groups and, hence, the crosslinking occur suddenly at a specific temperature. As a result, the film has only limited flow properties. "Low-bake" combinations generally exhibit inadequate film surface qualities. Moreover, if the proportion of urethane structures is increased, a deterioration of the solubility characteristics of such systems occurs.

The use of blends of different crosslinking systems, as proposed in DE 34 32 233 A, is unsuccessful in providing both a low-temperature cure and good film properties in most instances since the incompatibility of the components results in separation occurring in the binder combination or in the paints produced from the binder combination. It is recognized that this disadvantage can be overcome by partial condensation of the transesterification component with the basic binder, but this reduces the deposition voltage and intensifies the susceptibility to hydrolysis of the other ester groups which are present.

SUMMARY OF INVENTION

It has now been found that both a low-temperature cure and good film characteristics can be obtained by using crosslinking components in the paint binder having a combination of crosslinking mechanisms. The invention, therefore, relates to crosslinking components for paint binders containing hydroxyl groups, tertiary and/or secondary and/or primary amino groups, particularly for cathodically depositable paints which can be crosslinked by transesterification and/or transamidation and/or transurethanization, these crosslinking components being characterized in that they contain, per molecule, at least 0.5, and preferably at least 1.0, transesterifiable groups, originating from CH-activated esters, preferably malonic acid diesters, and at least 0.5, preferably at least 1.0, blocked isocyanate groups.

The invention also relates to a process for preparing crosslinking components for paint binders containing hydroxyl groups and/or tertiary and/or secondary and/or primary amino groups, more particularly for cathodically depositable paints, which are crosslinkable by transesterification and/or transamidation and/or transurethanization, and characterized in that at least 0.25 mole, preferably 0.5 mole, of hydroxyl groups of a polyol and/or an alkanolamine having at least 2 hydroxyl groups is transesterified with an ester having the formula

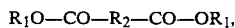

wherein
$R_1$ represents identical or different $C_{1-8}$ alkyl groups,
$R_2$ represents one of the groups —$CH_2$—, —CH=CH—, —CH(OH)—$CH_2$—, —C(OH)=CH—, —CH(OH)—CH(OH)— or

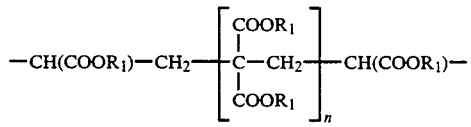

and
n is equal to 0 to 2,
until 1 mole of the esterifying alcohol has been split off for each mole of the ester; and in a second reaction step at least one further hydroxyl group of the polyol is reacted with a polyisocyanate compound such as a diisocyanate wherein the NCO-groups in excess of 2, and preferably in excess of 1, are blocked with a blocking agent.

Surprisingly, the crosslinking components according to the invention provide a substantially more favorable range of qualities than blends of the transesterifiable compounds and blocked isocyanate compounds of equivalent composition.

GENERAL DESCRIPTION OF INVENTION

The polyhydroxyl compounds suitable for synthesizing the crosslinking components are the straight-chained or branched alkylene glycols, the trimethylol alkanes, as well as oligomeric polyesters having 2 to 5 hydroxyl groups. It is preferable to use triols, particularly the trimethylol alkanes. Diols are preferably used when higher functional transesterification and/or isocyanate compounds are used.

In a first step the polyols are partially reacted with an ester of formula

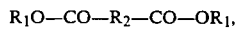

in which the groups R₁ and R₂ are as hereinbefore defined. The preferred esters are the methyl and ethyl esters of malonic acid, as well as higher-functional compounds obtained from these esters, as described in Austrian Patent No. 379,602. The progress of the reaction is monitored by determining the quantity of alcohol split off. The reaction is terminated when 1 mole of the esterification alcohol has been split off for each mole of ester component used. For each mole of polyol, at least 0.25 mole, and preferably 0.5 to 2 moles, of the ester components are used.

In a second reaction step, at least one other hydroxyl group of the polyol is reacted with a polyisocyanate compound such as a diisocyanate wherein the NCO-groups in excess of a maximum of 2, preferably in excess of a single free remaining NCO-group, are blocked with a blocking agent. The diisocyanate used according to the invention is preferably the standard commercial toluylene diisocyanate, or isophorone diisocyanate, or hexamethylene diisocyanate, and the standard commercial dimers and trimers thereof. The blocking agents used are preferably monohydroxyl compounds such as alcohols and glycol monoethers, for example n-butanol, 2-ethylhexanol, monoethylene glycolether, monoor diethylene glycol butylether, monoethylene glycol hexylether or methoxypropanol. It is also possible to use conventional blocking agents such as phenols, ketoximes, etc. Preferably, blocking agents having a deblocking temperature not exceeding 160° C. are utilized. The reaction of the second reaction step is continued until an NCO-value of zero is obtained. In order to achieve sufficient functionality of the crosslinking component, preferably all the hydroxyl groups of the polyol are reacted. The ratio of transesterifiable component to the isocyanate component is preferably 0.5 to 1.0 mole : 2.5 to 2 moles per mole of the triol, if triols are used.

The products of the process are advantageously used in the form of a solution in water-compatible solvents, preferably in glycol ethers. The solvents are optionally put in all at once or added in batches in the individual reaction steps. Obviously, only inert solvents should be used.

A large number of cationic binders are available for use in combination with the crosslinking components of the present invention. These include, for example, the so-called epoxy resin-amine adducts of the various glycidyl group-containing compounds based on phenols, diols and the like, or based on copolymers. Other products are based on copolymers which contain aminoacrylates as co-monomers or on Mannich reaction products of phenols, which may be modified in a number of ways. The crosslinking components according to the invention are mixed with a cationic binder, preferably at temperatures up to 60° C. If desired, partial condensation of the crosslinking component and binder may also be carried out at temperatures up to 120° C.

The protonation of the cationic binders is advantageously effected after they have been mixed with the crosslinking component. Further processing of the binders as well as the choice of suitable pigments, extenders and additives and optionally the addition of other types of resins are known to those skilled in the art. This is also true of the processing of the paints in conventional manner or by the electrodeposition painting method and for the testing of the crosslinked films.

PRESENTLY PREFERRED EMBODIMENTS

The examples which follow illustrate the invention without restricting its scope. All the amounts given in parts or percentages are based on units by weight, unless otherwise stated.

In the examples the following abbreviations are used:
DGDME.......... diethyleneglycol dimethylether
EGL............. ethyleneglycol monoethylether
BUGL........... ethyleneglycol monobutylether
HGL............. ethyleneglycol monohexylether
MP............. methoxypropanol
TDI............ toluylene diisocyanate (standard commercial isomer mixture)
HMDI........... hexamethylene diisocyanate
D-HMDI......... dimeric HMDI (Tolonate HDB)
T-HMDI......... trimeric HMDI (Tolonate HDT)
IPDI........... isophorone diisocyanate
EHEX........... 2-ethylhexanol
DEAPA.......... N,N-diethylaminopropylamine

Preparation Of The Components

Crosslinking Component B 1

134 g (1 mole) of trimethylol propane are mixed with 160 g (1 mole) of diethylmalonate, and the mixture is heated until distillation starts (about 140° C. to 150° C.). As the temperature rises (up to 180° C.), 46 g (1 mole) of ethanol are distilled off. When the reaction has ended, the mixture is diluted with 128 g of DGDME and cooled to 60° C. Then 264 g (1 mole or 1 NCO-equivalent) of a reaction product of 1 mole of TDI and 1 mole of EGL are added within 4 hours and at 60° C. reacted to an NCO-content of less than 0.02 milliequivalents per gram of sample.

The product obtained has a solid resin content of 80±2% (30 minutes, 120° C.) and a viscosity according to Gardner-Holdt of K (10 g of product +2 g DGDME). The refractive index of the crosslinking component at 20° C. is $n_D = 1.4960 \pm 0.001$.

Crosslinking Component B 2

At 80° C., 13.86 g (0.42 mole) of 91% paraformaldehyde are added in batches to a mixture of 134.4 g (0.84 mole) of diethyl malonate, 0.286 g (0.0034 mole) of piperidine and 0.185 g (0.0034 mole) of 85% formic acid, in a controlled manner so that when the exothermic reaction starts the temperature does not exceed 95° C. The reaction mixture is stirred at 95° C. until the paraformaldehyde has dissolved completely. The temperature is increased to 110° C. within 2 hours, as water begins to be split off. After a temperature of 110° C. has been reached, a total of 9.24 g (0.51 mole) of water are distilled off using special petrol (boiling range 80° C. to 120° C.) as an entraining agent. The entraining agent used is then distilled off with the application of a vacuum. The product has a solids content of 78 ±2% (30 minutes, 120° C.). The refractive index has a value of $n_D/20 = 1.437 \pm 0.002$.

Then 134 g (1 mole) of trimethylolpropane are added and the mixture is heated until distillation starts (140° C. to 150° C.). As the temperature increases, 23 g (0.5 mole) of ethanol are distilled off. After the quantity of distillate has been reached, dilution is carried out with 263 g of DGDME, and the mixture is cooled to 30° C. At 30° C., within 6 hours, 800 g (2.5 moles or 2.5 NCO-equivalents) of a reaction product of 2.5 moles TDI and 2.5 moles HGL are added. In another 4 hours the temperature is raised to 100° C. and reaction is carried out at this temperature until an NCO-content of less than 0.01 milliequivalents per gram of sample is achieved.

The resulting product with a solid resin content of 80±2% (30 minutes, 120° C.) has a refractive index $n_D/20$ of 1.507±0.001, and a viscosity (10 g of resin solution +4 g of DGDME) of E to F (Gardner-Holdt).

Crosslinking Component B 3

An intermediate product prepared in the same way as in B 2 from diethylmalonate and paraformaldehyde is mixed with 149 g (1 mole) of TROLA and heated until splitting off of ethanol begins (about 110° C.). in all, 23 g (0.5 mole) of ethanol are distilled off and the mixture is then diluted with 440 g of DGDME and cooled to 20° C. At 20° C., with cooling, 760 g (2.5 moles) or 2.5 NCO-equivalents of a reaction product of 2.5 moles of TDI and 2.5 moles of EHEX are added over a period of 6 hours and at this temperature reaction is carried out until an NCO-content of less than 0.01 milliequivalents per gram of resin solution is obtained.

The product obtained has the following characteristics:

| | |
|---|---|
| Solid resin content (120° C., 30 minutes) | 70 ± 2% |
| Viscosity (10 g of resin solution + 2 g DGDME) | D-E (Gardner-Holdt) |
| Amine number (based on solid resin content) | 54 mg KOH/g of solid resin |
| Refractive index $n_D/20$ | 1.492 ± 0.001 |

Crosslinking Component B 4

To a mixture of 160 g (1 mole) of diethylmalonate, 0.34 g (0.004 mole) of piperidine and 0.22 g (0.004 mole) of 85% formic acid, 16.5 g (0.5 mole) of 91% paraformaldehyde are added in batches at 80° C. so that when the exothermic reaction starts the temperature does not exceed 95° C. The reaction mixture is stirred at 95° C. until the paraformaldehyde is completely dissolved. The temperature is raised to 110° C. within 2 hours as the water begins to split off. After a temperature of 110° C. has been reached, a total of 11 g (0.61 mole) of water are distilled off using special petrol (boiling range 80° C. to 120° C.) as entraining agent. Then the entraining agent used is distilled off, with the application of a vacuum. The product has a solids content of 78±2% (30 minutes, 120° C.). The refractive index gives a value of $n_D/20 = 1.437±0.002$. After the addition of 90 g (1 mole) of 1,4-butanediol, the temperature is increased until ethanol begins to be distilled off and 46 g (1 mole) of ethanol are distilled off; dilution is effected with 117 g of DGDME and then the mixture is cooled to 40° C. Within 4 hours, 258 g (1 mole or 1.0 NCO-equivalent) of a reaction product 1 mole of HMDI and 1 mole of n-butanol are added, and the mixture is reacted for 6 hours at 40° C. until an NCO-content of less than 0.01 milliequivalents per gram of sample is achieved.

The product obtained has the following characteristics:

| | |
|---|---|
| Solid resin content (120° C., 30 minutes) | 80 ± 2% |
| Viscosity (10 g of resin solution + 2 g DGDME) | H-I (Gardner-Holdt) |
| Refractive index $n_D/20$ | 1.487 ± 0.002 |

Crosslinkinq Component B 5

118 g (1 mole) of hexanediol-1,6 and 160 g (1 mole) of diethylmalonate are heated until the distillation of ethanol begins and 46 g (1 mole) of ethanol are distilled off. Then the mixture is diluted with 259 g of DGDME and cooled to 50° C. At 50° C., 372 g (1 mole or 1 NCO-equivalent) of a reaction product of 1 mole IPDI and 1 mole tert.butylphenol are added, and the mixture is reacted to yield an NCO-content of less than 0.01 milliequivalents per gram of sample.

The final product has the following characteristics:

| | |
|---|---|
| Solid resin content (30 minutes, 120° C.) | 70 ± 2% |
| Viscosity (10 g resin solution + 2 g DGDME) | H-J (Gardner-Holdt) |
| Refractive index $n_D/20$ | 1.491 ± 0.002 |

Crosslinkinq Component B 6

149 g (1 mole) of triethanolamine are heated with 432 g (2 moles) of dibutylmalonate until 148 g (2 moles) of butanol are distilled off through a column. Then 385 g of DGDME are added as diluent, and the mixture is cooled to 50° C. At this temperature, 660 g (1 NCO-equivalent) of a reaction product of 1 mole D-HMDI and 1 mole HGL, made into an 80% solution with DGDME, are added within 4 hours, and the mixture is reacted to give an NCO-content of less than 0.01 milliequivalents per gram of sample.

The product obtained has the following characteristics

| | |
|---|---|
| Solid resin content (30 minutes, 120° C.) | 65 ± 2% |
| Viscosity (10 g resin solution + 2 g DGDME) | D-E (Gardner-Holdt) |
| Refractive index $n_D/20$ | 1.4807 ± 0.002 |

Crosslinking Component B 7

134 g (1 mole) of trimethylolpropane and 264 g (2 moles) of dimethyl malonate are heated until distillation begins and 64 g (2 moles) of methanol are distilled off through a column. Then the mixture is diluted with 397 g of DGDME and cooled to 60° C. Within 4 hours, 94I g (1 NCOequivalent) of a reaction product of 1 mole of T-HMDI and 2 moles of MP, made into an 80% solution with DGDME, are added. The reaction temperature is raised to 100° C. and maintained until an NCO-content of less than 0.01 milliequivalents is obtained.

The product has the following characteristics:

| | |
|---|---|
| Solid resin content (120° C,. 30 minutes) | 65 ± 2% |
| Viscosity (10 g of resin solution + 2 g DGDME) | K-L (Gardner-Holdt) |
| Refractive index $n_D/20$ | 1.477 ± 0.002 |

For the comparison tests the crosslinking components B 8 and B 9 were prepared as follows:

Crosslinking Component B 8

A transesterification product is prepared, corresponding to Component B 2 of Austrian Patent No. 372,099, from 396 g of dimethyl malonate and 134 g of trimethylol propane with 1.1 g of zinc octoate (8% metal content). The mixture of substances is reacted at 130° C. for about 10 hours, during which time about 90 g of methanol escape as distillate. The finished polyfunctional ester is a colorless liquid with a hydroxyl number of 16 mg KOH/g.

Crosslinking Component B 9, Which Is A Polyurethane Crosslinker 134 g (1 mole) of trimethylol propane are dissolved in 397 g of DGDME. 792 g (3 moles or 3 NCO-equivalents) of a reaction product of 3 moles of TDI with 3 moles of EGL are added to this solution within 3 hours and the temperature of the exothermic reaction is kept at 40° C. by cooling until the NCO-content has dropped to less than 0.02 milliequivalents per gram of sample.

The product obtained has a solid resin content of 70±2% (30 minutes, 120° C.) and a viscosity according to Gardner-Holdt of O-P (10 g of product +3 g of DGDME). The refractive index of the polyurethane crosslinker at 20° C. is $n_D/20 = 1.4860 \pm 0.0015$.

The following resins having basic functionality were prepared for combining with the crosslinking components:

Basic Resin A 1

190 g of a bisphenol A-epichlorohydrin epoxy resin (1 epoxide equivalent) and 1425 g of a bisphenol A-epichlorohydrin epoxy resin (3 epoxide equivalents) are dissolved at 100° C. in 597 g of EGL. The solution is cooled to 60° C. and 126 g of diethanolamine are added. Over a period of 2 hours the temperature is slowly raised to 80° C. Then 169 g of DEAPA are added and the temperature is raised over 2 hours to 120° C. At this temperature, 478 g of CARDURA E 10 (Shell) are added, and then the mixture is stirred for 5 hours at 130° C. It is diluted with EGL to a resin content of 65%. The solid resin has an amine number of 91 mg KOH/g and a hydroxyl number of 265 mg KOH/g.

Basic Resin A 2

2 g of azobisisobutyronitrile are dissolved in 40 g of isopropanol while heating. A monomer mixture consisting of 20 g of glycidylmethacrylate, 20 g of hydroxyethylmethacrylate, 20 g of methyl methacrylate and 40 g of 2-ethylhexylacrylate in which 2 g of azobisisobutyronitrile are dissolved to form a clear solution are added to the previous clear solution at reflux temperature (about 84° C.) uniformly over a period of 2 hours. The reaction mass is stirred for a further 3 hours at reflux temperature. A homogeneous solution of 16 g of diisopropanolamine in 20 g of BUGL is rapidly added to the reaction mass at 85° C., then stirring is continued for 2 hours at 90° C. The product is diluted at 90° C. with 13 g of EGL and at 40° C. with 10 g of acetone.

The resin has a solids content of 57%, an amine number of 58 mg KOH/g and a hydroxyl number of 250 mg KOH/g.

Basic Resin A 3

380 g of an epoxy novolak resin (epoxide equivalent about 190) are dissolved in 354 g of DGDME and at 80° C. reacted with 269 g of a semiester of tetrahydrophthalic acid anhydride and hydroxyethyloxazolidine and with 37 g of diethylamine and 140 g of tall oil fatty acid until an acid number of less than 3 mg KOH/g is obtained. Then, after the addition of 10 millimole of acetic acid (3N) per 100 g of solid resin, the resin is stirred for 3 hours at 65° C. The product has an hydroxyl number corresponding to 270 mg KOH/g.

Basic Resin A 4

1627 g (3.43 Val) of an epoxy resin based on bisphenol A and epichlorohydrin (epoxide equivalent weight about 475) are reacted with 226 g (0.24 COOH-Val) of a polyester obtained from 3 moles of trimethylolpropane, 2 moles of adipic acid, 1 mole of isononanoic acid and 1 mole of tetrahydrophthalic acid hydride (acid number 65 mg KOH/g, carboxyl equivalent 942 g) in 85% solution in MP at 110° C. until an acid number of less than 5 mg KOH/g is obtained. After the mixture has been diluted with MP to give a solids content of 70%, a mixture of 94.5 g (0.9 Val) of diethanol amine, 67.5 g (0.9 Val) of methylethanolamine, 78 g (1.2 Val) of DEAPA and 240 g of MP is added at 60° C. within 2 hours. Then the temperature is increased to 90° C., and this temperature is maintained for 1 hour. The solids content is then adjusted to 70% with MP. "Val" as used herein means equivalents of the functional groups, i.e., amine groups or epoxy groups, etc.

Basic Resin A 5

570 g (3 Val) of an epoxy resin based on bisphenol A and epichlorohydrin (epoxide equivalent about 190) and 317 g of MP are heated to 60° C. and within 2 hours a mixture of 116 g (0.9 Val) of ethylhexylamine and 163 g (0.15 NH-Val) of a polymeric amine prepared as hereinafter described is added and reaction is carried out until an EPA-value of 2.06 is obtained. EPA-value is hereinafter described. Then 1330 g (2.1 Val) of a 75% solution of bisphenol A-epichlorohydrin epoxy resin (epoxide equivalent 475) in MP are added. At 60° C., a solution of 189 g (1.8 Val) of diethanolamine in 176 g of MP are also added within 1 hour, and the reaction is continued until an MEQ-value of 1.57 is obtained. After the further addition of a solution of 78 g (1.2 Val) of DEAPA in 54 g of MP within 1 hour, reaction is carried out at 60° C. until an EPA-value of 1.46 is obtained. The temperature is increased to 90° C. and then to 120° C. within another hour. When a viscosity of I-J is obtained (Gardner-Holdt; 6 g of resin +4 g of MP), the mixture is diluted with MP to give a solids content of 65%. The product has an amine number of 117 mg KOH/g and a hydroxyl number of 323 mg KOH/g.

The polymeric amine as above utilized is prepared by reacting 1 mole of diethylenetriamine with 3.1 moles of 2-ethylhexylglycidyl ether and 0.5 mole of a bisphenol Aepichlorohydrin epoxy resin (epoxide equivalent about 190) in 80% MP solution. The product has a viscosity (DIN 53211/20° C.; 100 g of resin +30 g of MP) of 60 to 80 seconds.

"EPA-value" as used herein is the total oxirane and amine groups in milliequivalents determined as follows:

Weigh-out exactly 0.2–0.4 g resin, melt in 5 drops of toluene, and cool. Add 25 ml of a mixture of 4 parts (vol) of dichloromethane and 1 part (vol) of glacial acetic acid and dissolve by slightly warming. At room temperature, add 0.5 g of tetrabutylammoniumiodide. Add 3 drops of crystalviolet solution and titrate with 0.1 N perchloric acid in glacial acetic acid going from a blue-violet color to a grass-green color with no blue tone.

Run a parallel blank test without resin.

$$\text{The EPA} - \text{value} = \frac{(A - B) \times 0.1 \times f}{\text{weigh-out }(g)}$$

wherein

A = ml 0.1 N perchloric acid for sample
B = ml 0.1 N perchloric acid for blank test
f = factor of 0.1 N perchloric acid Factor f is determined with potassium hydrogenphthalate (p.a.) as follows:

Weigh-out exactly, within 0.1 milligram, in an Erlenmeyer flask 200 mg of potassium hydrogenphthalate (p.a.). Add 30 ml of glacial acetic acid and 3 drops of crystalviolet solution (0.1% in glacial acetic acid) and titrate with the approximately 0.I N perchloric acid in glacial acetic acid going from a blue-violet color to a grass-green color.

$$f = \frac{W}{C \times 20.422}$$

wherein
W = mg potassium hydrogenphthalate (p.a.)
C = ml approximately 0.1 N perchloric acid in glacial acetic acid

Basic Resin A 6

A modified epoxide-amine adduct, described as Basic Resin A 4, is combined, in the last phase, with 5% by weight of polypropylene glycol diglycidylether at 90° C. and reacted at 120° C. until all the glycidyl groups have reacted. The product has an amine number of 76 mg KOG/g and a hydroxyl number, based on primary hydroxyl groups, of 89 mg KOH/g.

EXAMPLES 1 to 10

The crosslinking components prepared according to the invention were combined with various basic resins under the conditions shown in Table 1.

For this purpose, the components were mixed or partially reacted in 70% solution in MP under the conditions specified in Table 1.

TABLE 1

| Example | Parts of Solid Resin Basic Resin (A) | | Parts of Solid Resin Crosslinking Component (B) | | Hours/°C. |
|---|---|---|---|---|---|
| 1 | 70 | A 1 | 30 | B 1 | 2/120 |
| 2 | 80 | A 2 | 20 | B 6 | 0.5/60 |
| 3 | 75 | A 3 | 25 | B 5 | 2/100 |
| 4 | 75 | A 4 | 25 | B 7 | 1/90 |
| 5 | 70 | A 5 | 30 | B 2 | 2/120 |
| 6 | 80 | A 6 | 20 | B 4 | 0.5/60 |
| 7 | 75 | A 5 | 25 | B 3 | 1/90 |
| 8[1] | 70 | A 1 | 30 | B 8 | 2/100 |
| 9 | 80 | A 4 | 20 | B 9 | 0.5/60 |
| 10[2] | 70 | A 4 | 15 | B 8 | 0.5/60 |
|   |    |     | 15 | B 9 |        |

[1]Curing component separates after 4 days.
[2]After about 10 hours, the curing component B 8 separates out of a 15% aqueous solution obtained from this binder combination and neutralized with 45 millimole of formic acid per 100 g of solid resin.

Evaluation of Binder Combinations

After neutralization with 40 to 60 millimole of formic acid and dilution with deionized water to a solids content of 15%, the binders were cathodically deposited as a clear varnish on cleaned, non-pretreated sheet steel at a dry film thickness of 18±2 μm and stoved for 25 minutes at 160° C.

The cured films were subjected to the following tests.
(1) Rubbing with acetone-impregnated cotton wool until the film softens perceptively.
(2) Testing with the apparatus made by Erichsen of the Federal Republic of Germany (1 inch × pound = 0.113 joules).
(3) ASTM 117-64, duration of test 250 hours, underrusting (both sides of the cut) specified in millimeters.
(4) Corrosion alternating test VDA 621-415; testing on zinc-phosphate coated sheet steel; duration of test 10 cycles; the value given is the underrusting (both sides of the cut) in millimeters.

In the tests specified, the following values were obtained for Examples 1 to 7:
Acetone Test (1) ........ more than 100 seconds
Impact Strength (2) ..... 60-80 inches × pounds
Salt Spray Test (3) ..... 2-5 mm
VDA Characteristic (4).. 2-6 mm In comparison Examples 8 to 10, the following values were obtained:

|  | Examples | | |
|---|---|---|---|
|  | 8 | 9 | 10 |
| Acetone Test (1) | over 100 | 10 | over 100 |
| Impact Test (2) | 40 | 10 | 60 |
| Salt Spray Test (3) | 4 | 8 | 5 |
| VDA characteristic (4) | 3 | 7 | 6 |

These values deteriorate substantially as soon as the separation of the components becomes detectable in Examples 8 and 10.

As will be apparent to one skilled in the art, various modifications can be made within the scope of the aforesaid description. Such modifications being within the ability of one skilled in the art form a part of the present invention and are embraced by the appended claims.

It is claimed:

1. A crosslinking component for paint binders containing functional groups selected from the group consisting of hydroxyl groups, tertiary amino groups secondary amino groups and primary amino groups, and mixtures thereof, particularly for cathodically depositable paints, which can be crosslinked by transesterification, or transamidation or transurethanization, or a combination of said transesterification, transamidation and transurethanization, characterized in that said crosslinking component contains, per molecule, at least 0.5 transesterifiable groups, obtained from an ester containing a reactive CH-group, and at least 0.5 blocked isocyanate groups.

2. The crosslinking component of claim 1 wherein said crosslinking component contains at least 1.0 transesterifiable group and at least one blocked isocyanate group.

3. The crosslinking component of claims 1 or 2 wherein said ester is a malonic acid diester.

4. Process for preparing crosslinking components for paint binders containing functional groups selected from the group consisting of hydroxyl groups, tertiary amino groups, secondary amino groups and primary amino groups, particularly for cathodically depositable paints, which can be crosslinked by transesterification, or transamidation or transurethanization, or a combination of said transesterification, transamidation and transurethanization, comprising reacting at least 0.25 mole of hydroxyl groups of a polyol or an alkanolamine having at least two hydroxyl groups with an ester of formula $R_1O-CO-R_2-CO-OR_1$, wherein $R_1$ represents identical or different $C_{1-8}$ alkyl groups, $R_2$ represents one of the groups $-CH_2-$, $-CH=CH-$, $-CH(OH)-CH_2-$, $-C(OH)=CH-$, $-CH(OH)-CH(OH)-$, or

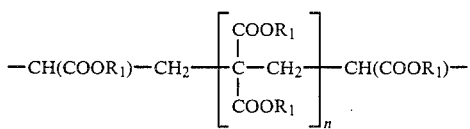

and n is equal to 0 to 2, until 1 mole of the esterifying alcohol has been split off for each mole of the ester, and, thereafter, in a second reaction step reacting at least one further hydroxyl group of the polyol with a polyisocyanate compound wherein the NCO-groups in excess of two, are blocked with a blocking agent.

5. The process of claim 4 wherein at least 0.5 mole of hydroxyl groups of said polyol or alkanolamine is transesterified.

6. The process of claims 4 or 5 wherein the NCO-groups in excess of about one are blocked with a blocking agent.

7. The process of any one of claims 4-6 wherein a trimethylolalkane is used as the polyhydroxyl compound.

8. The process of any one of claims 4-7 wherein the blocking agent used to block the isocyanate groups has a deblocking temperature of not more than about 160° C.

9. The process of any one of claims 4-8 wherein the polyol is a triol and for each mole of a triol 0.5 to 1 mole of the transesterifiable component and 2.5 to 2 moles of the isocyanate component are used.

10. The crosslinking component obtained from the process of any one of claims 4-8.

* * * * *